(12) United States Patent
Nazarian et al.

(10) Patent No.: US 6,445,524 B1
(45) Date of Patent: Sep. 3, 2002

(54) METHOD OF OPERATING A DISK DRIVE FOR WRITING TO AN ADDRESSABLE LOCATION AFTER DETECTING THAT A HEAD IS WITHIN A SAFE-TO-WRITE WINDOW

(75) Inventors: Ara W. Nazarian, Tustin; Raffi Codilian, Irvine, both of CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/458,527

(22) Filed: Dec. 20, 1999

(51) Int. Cl.[7] .................................. G11B 27/02
(52) U.S. Cl. ............................. 360/49; 360/31
(58) Field of Search ........................ 360/49, 31, 47, 360/25, 53, 48

(56) References Cited

U.S. PATENT DOCUMENTS 5,477,525 A * 12/1995 Okabe .................. 369/275.3

* cited by examiner

Primary Examiner—David Hudspeth
Assistant Examiner—Varsha Kapadia
(74) Attorney, Agent, or Firm—Milad G Shara, Esq.

(57) ABSTRACT

A method of operating a disk drive to efficiently recover from an event which interrupts a safe-to-write condition that occurs during a write operation includes receiving a string of data blocks for writing on respective addressable locations on a track of a disk in the disk drive. During a pass of the addressable locations under the read/write head, the head is positioned to follow the track within a tolerance limit and a first write operation is started to write the string of data blocks on the track. During the first write operation, if it is detected that a safe-to-write condition no longer exists, as may be triggered by a shock event, the first write operation is aborted. When it is later determined that the safe-to-write condition is asserted, a second write operation is defined to write a set of addressable locations within the string of data blocks which have yet to pass under the read/write head and the second write operation is performed. By performing the second write operation as soon as possible, the performance of the drive is improved.

5 Claims, 4 Drawing Sheets

METHOD OF OPERATING A DISK DRIVE FOR WRITING TO AN ADDRESSABLE LOCATION AFTER DETECTING THAT A HEAD IS WITHIN A SAFE-TO-WRITE WINDOW

BACKGROUND OF THE INVENTION

1. Field of the Invention

The present invention relates to disk drives. More particularly, the present invention relates to a method of operating a disk drive for writing to an addressable location after detecting that a head is within a safe-to-write window.

2. Description of the Prior Art

A disk drive has a control system generally comprising an interface microprocessor, which directs the activities of the disk drive, and a servo microprocessor, which controls the position of a read/write head. The interface and servo functions may be embodied in a single microprocessor or in separate microprocessors. A disk controller or formatter circuit automates disk data transfer functions such as reading and writing data sectors under control of the interface microprocessor. An exemplary such disk drive is shown in commonly assigned U.S. Pat. No. 5,965,992 to Goretzki et al which is hereby incorporated by reference.

During a write operation initiated by a host computer, a disk drive receives a sequential series or "string" of data blocks from the host. The string of data blocks is stored in a disk memory buffer for writing to corresponding addressable locations on a data track of a disk. Each addressable location may be a structure on the track known as a data sector, conventionally referenced by a logical block address (LBA). The control system of the disk drive requires that the read/write head be positioned over the track and that the head follow the track to within a tolerance limit during the entire write operation. When the head is positioned within the tolerance limit, the head is said to be within a safe-to-write window. If the head wanders off-track or outside the tolerance limit for whatever reason during a write operation, the head is declared to be outside the safe-to-write window by the control system and the write operation must stop to avoid overwriting data on an adjacent track or tracks. One reason the head may wander off-track is that the drive may have been subjected to a shock impulse. Conventionally, to recover from such a shock event, the disk drive control system will wait until the head is once again following the track within the tolerance limits and the first addressable location corresponding to the string passes under the head on a subsequent revolution of the disk before attempting to re-write the string of data blocks. The control system will therefore wait until the appropriate servo wedge preceding the first data block to be written passes under the head to verify track following within tolerance levels before attempting the write operation again.

It should be understood for this discussion that the disk drive head conventionally comprises an integration of separate read/write elements in a fixed relationship such that the read element provides position information to the servo controller and the servo controller uses the position information to position the head to place the write element on track for writing.

FIG. 1 is a timing diagram of a write operation in a prior art disk drive in the presence of a condition causing the head to wander outside a safe-to-write window. FIG. 1 is divided into an upper and a lower portion. The upper portion illustrates sequences of events occurring during a first pass of the addressable locations under the head, whereas the lower portion thereof illustrates the sequence of events occurring during a second pass of the addressable locations under the head. Bold arrows 102 and 104 indicate the length of time the write operation is pending during the first and second passes respectively. A disk track 150, as shown in FIG. 1, includes a plurality of addressable locations D1–D12 corresponding to a string of logical data blocks D1–D12, received from a host for writing, and embedded servo sectors or "wedges" S1–S3 interspersed there between. The servo wedges are read by the head and used by the control system to determine the head's most recent position on the disk. As the head positioning system is a sampled system, the precise position of the head is unknown until a servo wedge is read and the position information stored therein is processed. As shown in FIG. 1, a disk controller command (Write D1–D12) is issued by a system control microprocessor to cause the head to write data blocks D1 through D12 on the track 150 from a buffer memory. As the media is rotating, the disk controller has an opportunity to write the data blocks D1–D12 during a "pass" of the string of data blocks D1–D12 under the head. The pass is initiated by the addressable location D1 passing under the head. The pass is terminated when the addressable location D12 passes under the head. In the illustration of FIG. 1, the shaded addressable locations have been written, whereas those that are not shaded have yet to be written to disk. During the writing of data block D2, a signal (safe-to-write) asserting a safe-to-write-condition is de-asserted, indicating that it is no longer safe to write to the disk. The safe-to-write signal is a signal that is transmitted by the servo controller and if de-asserted may cause the write operation to be immediately aborted. The safe-to-write signal may be de-asserted for a variety of reasons, and generally indicates a temporary condition that may disappear over time.

A shock event is one such temporary condition. During the shock event, the head may have wandered outside a safe-to-write window, increasing the likelihood that data on adjacent tracks may be inadvertently overwritten. After reading the servo wedge S2 and determining that the head is now back on the desired track or within the tolerance limit, the safe-to-write signal is re-asserted. There is some latency between the reading of the servo wedge S2 and the reassertion of the safe-to-write signal as the head passes over data sector D6, as some processing time is required to determine the position of the head. Although the diagram of FIG. 1 shows the safe-to-write signal being re-asserted immediately following servo wedge S2 for illustration of the concept, actual practice would dictate that the safe-to-write condition be tested repeatedly until some number of servo wedges have been read in succession to verify that the read/write head is staying within the safe-to-write window.

The writing of the data blocks, as shown in the upper portion of FIG. 1, stopped after writing D2. As shown in the lower portion of prior art FIG. 1, the disk drive control system refrains from writing any data blocks until another pass is initiated. In this case, the next pass is labeled as second pass. As whatever event caused the servo controller to de-assert a safe-to-write condition occurred at some indeterminate time prior to servo wedge S1, the servo controller (after the safe-to-write condition is restored at some time after S2 during the first pass) backs up and re-writes the entire string of data blocks D1–D12, as shown in the lower portion of FIG. 1. In practice, the head may be commanded to back up a predetermined number of blocks (as measured from the servo wedge at which it was determined that the head has wandered off-track) before rewriting all or a portion of the string of data blocks, as a precautionary measure. Therefore, according to the prior art disk drive operating method, at least two revolutions of the disk or one revolution plus the time for the complete string of blocks D1–D12 to pass under the head during second pass 104 are necessary to complete the write operation. In this illustration, the summed length of arrowed lines labeled 102 and 104 indicates the relative length of time required to complete the operation.

Original Equipment Manufacturers (OEM's) of disk-drive-containing systems often specify disk drive performance requirements that must be met by disk drive manufacturers. Such requirements often specify the maximum data transfer performance degradation that is allowed as the drives are subjected to and recover from an event (such as a shock impulse) that causes a safe-to-write condition to be terminated. In the case of a shock event, such performance requirements may be met by equipping the drive with costly shock sensors or mechanical shock dampeners, for example. Competitive pressures in the disk drive industry, however, preclude such a course of action. A preferred solution to the problem of efficiently recovering from an off-track condition would not require such added hardware. There is a need, therefore, for methods of operating a disk drive to efficiently recover from events terminating a safe-to-write-condition that do not depend upon costly mechanical hardware or added manufacturing steps.

SUMMARY OF THE INVENTION

This invention may be regarded as a method for writing a string of data blocks in a disk drive. The disk drive has a head positioned over a track on a rotating disk. The string of data blocks has a starting data block and an ending data block which are required to be written sequentially in respective addressable locations disposed on the track. The respective addressable locations include a leading addressable location corresponding to the starting data block and a trailing addressable location corresponding the ending data block. With regard to the invention, a pass is defined to be an interval which is initiated by the leading addressable location passing under the head, and terminated by the trailing addressable location passing under the head. The method of the invention comprises the steps of determining if the head is positioned within a safe-to-write window and if the head is determined to be positioned within a safe-to-write window, performing the steps of determining that an addressable location which is required to be written has passed under the head during the pass without being written; determining if another addressable location which is required to be written has yet to pass under the head during the pass; and if so then writing to the other addressable location during the pass.

DETAILED DESCRIPTION

Figure 3:
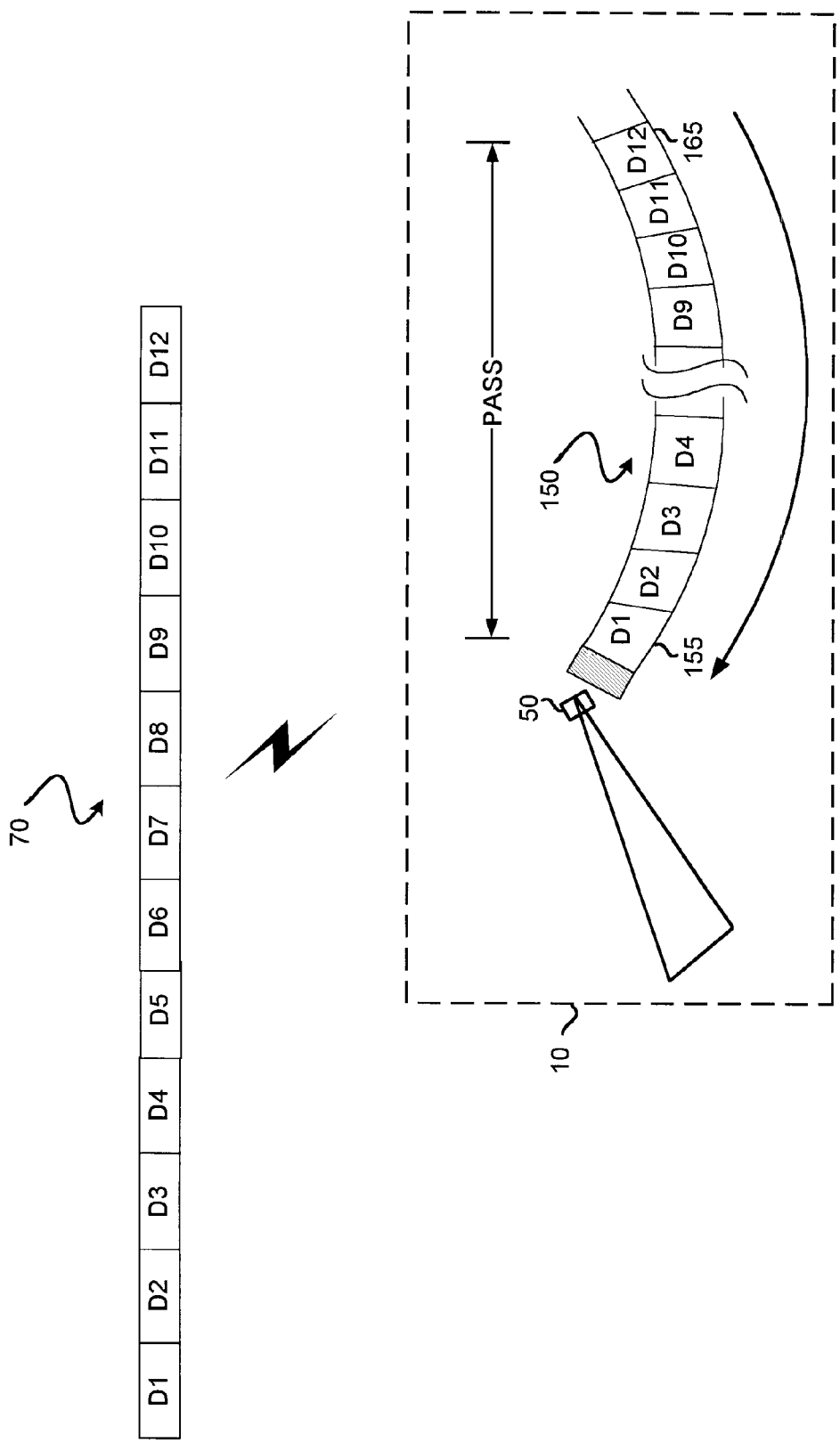
FIG. 3 is a diagram of a disk drive in which the method of the invention is practiced having a head positioned over a track on a rotating disk and having a string of data blocks to be written on the track during a pass of respective addressable locations under a head.

Referring to FIG. 3, a disk drive 10 has a head 50 positioned over a track 150 on a rotating disk. A string 70 of data blocks D1–12 is required to be written sequentially on respective addressable locations D1–12 shown on track 150. The string 70 of data blocks D1–D12 has a starting data block D1 and an ending data block D12. A leading addressable location 155 corresponds to starting data block D1 in string 70 while a trailing addressable location 165 corresponds to ending data block D12 in string 70. A pass is defined to be an interval (arrowed dimension PASS in FIG. 3) which is initiated by the leading addressable location 155 passing under the head 50 and which is terminated by the trailing addressable location 165 passing under the head 50.

Figure 4:
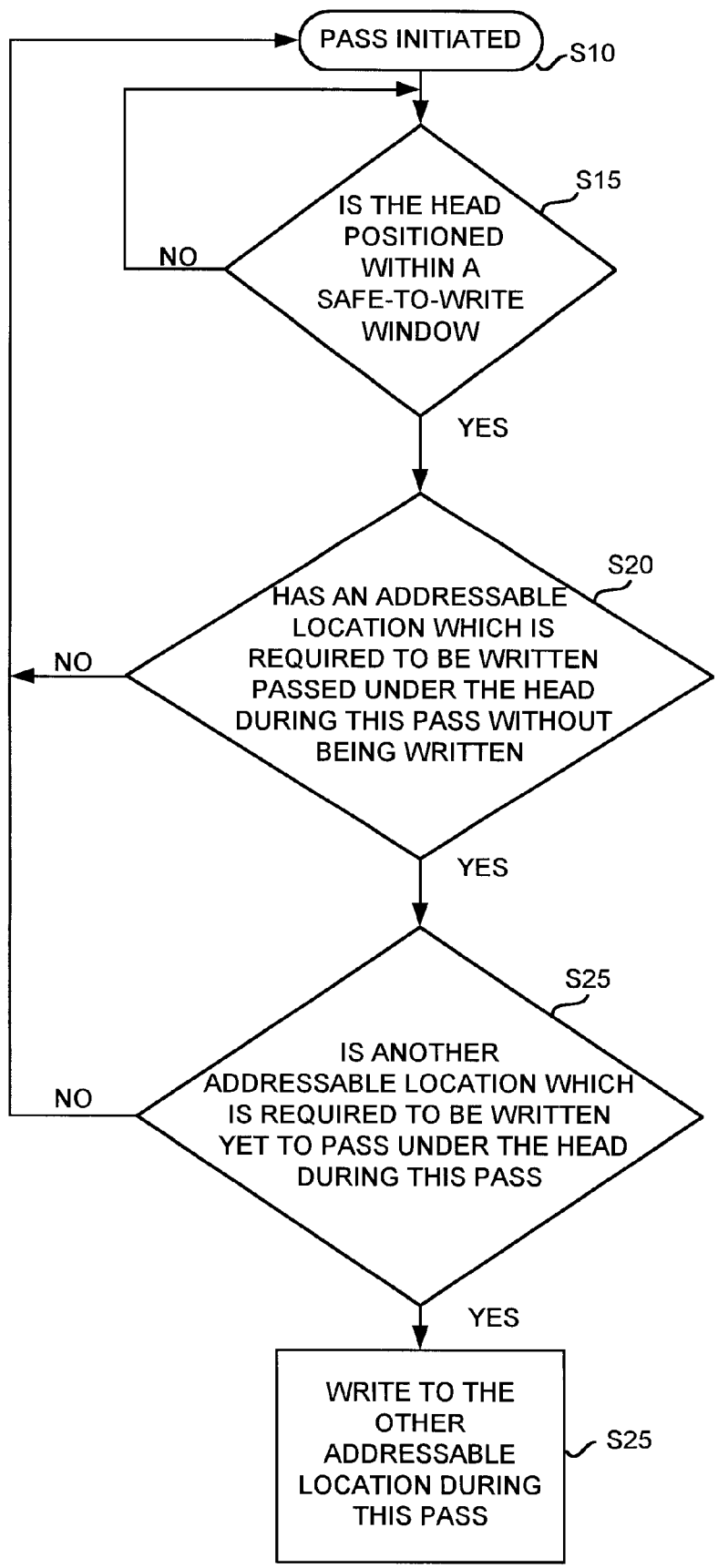
FIG. 4 is a flowchart of the method of the invention for operating a disk drive for writing to an addressable location after detecting that a head is within a safe-to-write window, according to an embodiment of the invention.

Referring to FIG. 4, a flow chart of a method for writing a string of data blocks after detecting a safe-to-write condition is shown. The method may be suitably employed in a disk drive such as described in the above-referenced Goretzki patent. The method begins at step S10 where a pass of respective addressable locations as described above is initiated. At step S15, the method determines whether the head is positioned within a safe-to-write window. If the determination is positive (YES branch at S15) then the method proceeds to step S20 to determine if an addressable location which is required to be written has passed under the head during the pass without being written, indicating that a pass interval has occurred. Of so, then the YES branch at step S20 proceeds to step S25 where the method determined if another addressable location which is required to be written is yet to pass under the head during this pass. If so, then the method proceeds to step S25 to write to the other addressable location during this pass.

Figure 1:
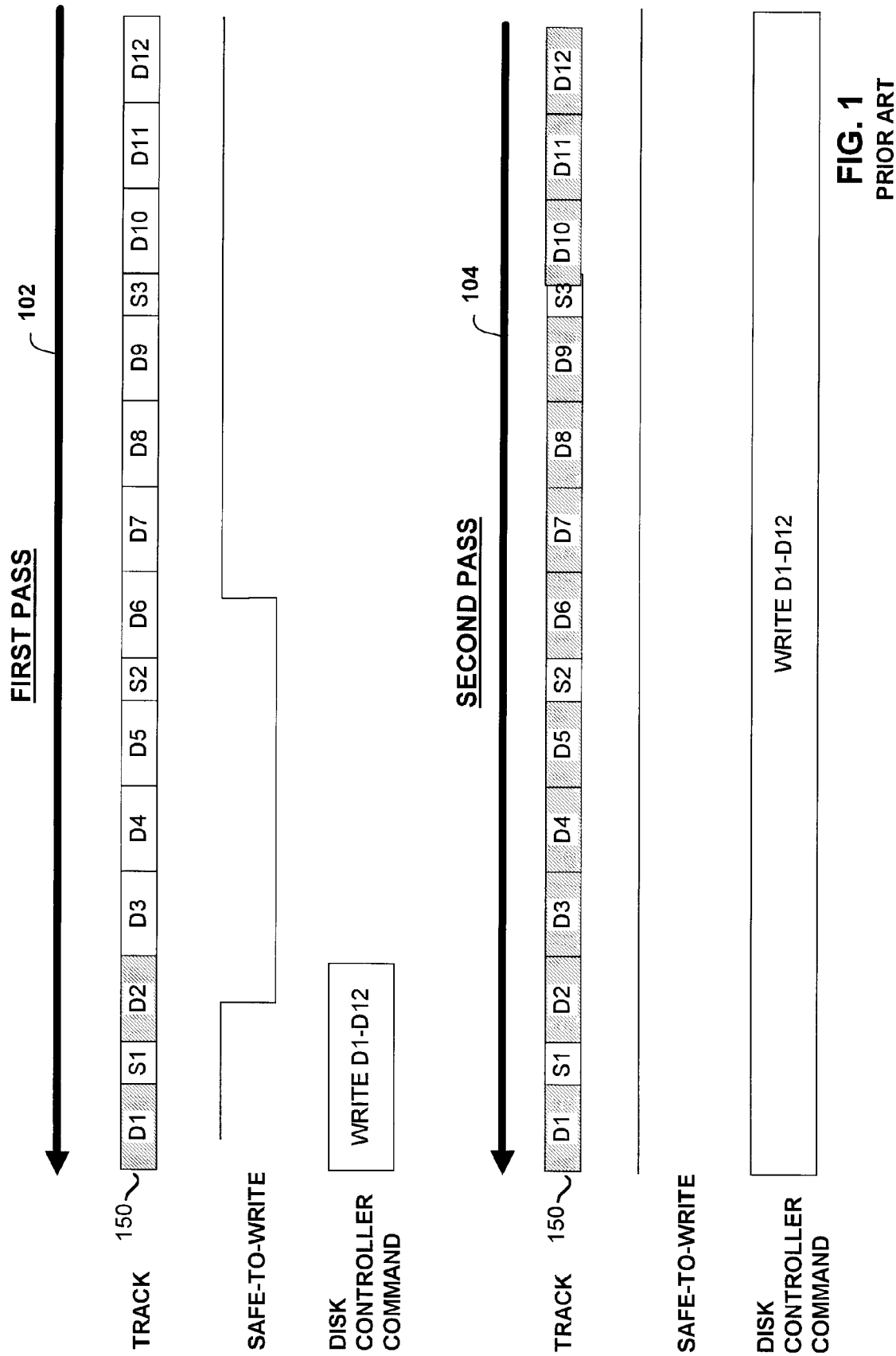
FIG. 1 is a timing diagram of a write operation of a prior art disk drive in the presence of an event which interrupts a safe-to-write condition.
Figure 2:
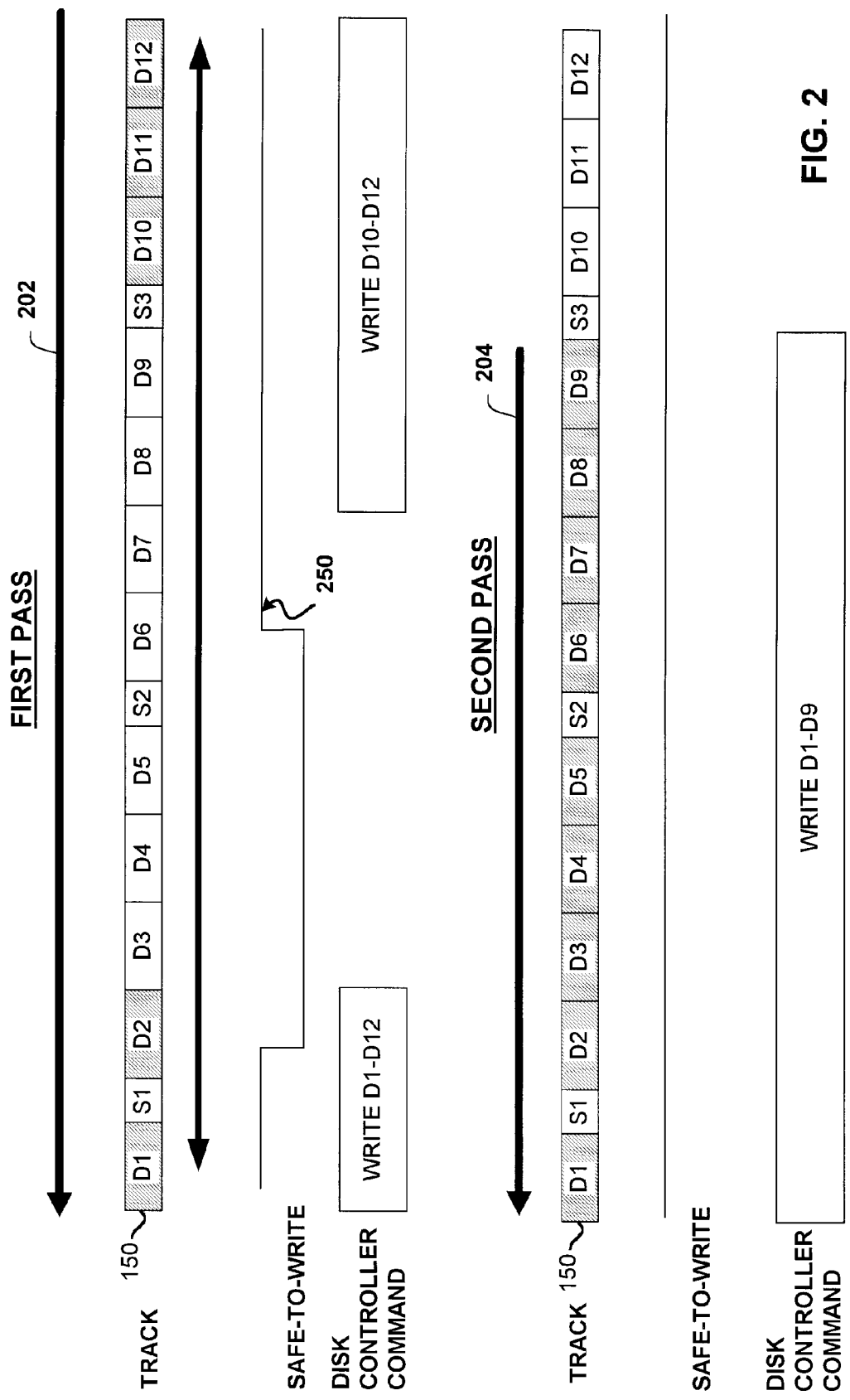
FIG. 2 is a timing diagram of a write operation of a disk drive according to an embodiment of the present invention as it efficiently recovers from an event which interrupts a safe-to-write condition.

FIG. 2 illustrates the execution in a timing sense of the above described method of operating a disk drive to efficiently recover from an interruption of a safe-to-write condition that occurs during a write operation. The timing diagram of FIG. 2 may be compared to the prior art sequence of FIG. 1 to illustrate a benefit of the invention. FIG. 2 is divided into an upper and a lower portion. The upper portion illustrates sequences of events occurring during a first pass whereas the lower portion thereof illustrates the sequence of events occurring during a second pass. Bold arrows 202 and 204 represent the length of time the write operation is pending during the first and second passes, respectively. In FIG. 2, the shaded blocks are data blocks that have been written, whereas those blocks that are not shaded have yet to be written to disk. At the outset, a string of data blocks such as string 70 in FIG. 3 are received for writing on track 150. During a first revolution of the disk, the disk control system positions the read/write head to follow the track within a tolerance limit and to start a writing operation to write the string of data blocks D1–Dl2 on the track. During this write operation, it is detected at servo wedge S1 that a safe-to-write condition no longer exists, indicating that the read/write head is positioned outside the tolerance window. Upon detecting the loss of a safe-to-write condition, the servo controller de-asserts the safe-to-write signal and the first write operation is aborted as shown by the termination of disk controller command "Write D1–12."

Thereafter, using the method of the invention, at servo wedge S2 during the first pass, the control system determines that the head is back within the tolerance window for writing. The control system then re-asserts the safe-to-write signal as shown. The method then determines at point 250 for example that the safe-write-signal is asserted and that an addressable location which is required to be written such as any of D3 through D6 has passed under the head without being written. The method then determines that an addressable location, such as D10, which is required to be written has yet to pass under the head during the first pass. The method schedules a disk controller command "Write D1–D12" and after verifying at servo wedge S3 that the safe-to-write signal remains asserted, writes to addressable locations D10–D12.

On a subsequent pass (Second Pass), the control system schedules a disk controller command to write the addressable locations D3–D9 which were not written during the first pass and as a precaution re-writes addressable locations D1–D2 as well. It may be noted that no rotational latency penalty ensues from the rewriting of D1–D2. By observing the summed length of arrowed segments 202 and 204 compared to the corresponding prior art segments in FIG. 1, it can be seen that the method of the invention provides a performance improvement by completing the write operation in a shorter time.

Moreover, this performance improvement does not necessitate additional hardware or manufacturing steps. The method of the invention is preferably stored in a disk drive magnetic media or in ROM and executed from RAM or ROM by a disk microprocessor such as that shown in the aforementioned commonly assigned patent to Goretzki et al.

What is claimed is:

1. In a disk drive having a head positioned over a track on a rotating disk, a method of writing a string of data blocks having a starting data block and an ending data block which are required to be written sequentially in respective addressable locations disposed on the track, the respective addressable locations having a leading addressable location corresponding to the starting data block and a trailing addressable location corresponding the ending data block and a pass is defined to be an interval which is initiated by the leading addressable location passing under the head, and terminated by the trailing addressable location passing under the head, the method comprising the steps of determining if the head is positioned within a safe-to-write window; if the bead is determined to be positioned within a safe-to-write window performing the steps of:

determining that an addressable location which is required to be written has passed under the head during the pass without being written;

determining if another addressable location which is required to be written has yet to pass under the head during the pass; if so then writing to the other addressable location during the pass.

2. The method of claim 1 wherein the respective addressable location is addressed by a logical block address.

3. The method of claim 1 wherein the method is executed by a disk control microprocessor.

4. The method of claim 1 wherein the safe-to-write window is defined by a safe-to-write signal.

5. The method of claim 1 wherein the addressable location which has passed under the head has a logical block address which is lower in sequence than a logical block address for the addressable location which is written during the pass.

* * * * *